(12) United States Patent
Cayeux

(10) Patent No.: US 9,389,969 B2
(45) Date of Patent: Jul. 12, 2016

(54) METHOD FOR SIP PROXY FAILOVER

(71) Applicant: Alcatel Lucent, Boulogne Billancourt (FR)

(72) Inventor: Christian Cayeux, Illkirch (FR)

(73) Assignee: Alcatel Lucent, Boulogne-Billancourt (FR)

( * ) Notice: Subject to any disclaimer, the term of this patent is extended or adjusted under 35 U.S.C. 154(b) by 135 days.

(21) Appl. No.: 14/353,855

(22) PCT Filed: Oct. 8, 2012

(86) PCT No.: PCT/EP2012/069823
§ 371 (c)(1),
(2) Date: Apr. 24, 2014

(87) PCT Pub. No.: WO2013/060567
PCT Pub. Date: May 2, 2013

(65) Prior Publication Data
US 2014/0298083 A1    Oct. 2, 2014

(30) Foreign Application Priority Data

Oct. 24, 2011 (EP) .................................... 11306371

(51) Int. Cl.
*G06F 11/00* (2006.01)
*G06F 11/20* (2006.01)
(Continued)

(52) U.S. Cl.
CPC .......... *G06F 11/2002* (2013.01); *H04L 65/105* (2013.01); *H04L 65/1006* (2013.01); *H04L 65/1069* (2013.01); *H04L 65/1073* (2013.01); *H04L 67/28* (2013.01); *H04L 69/40* (2013.01)

(58) Field of Classification Search
CPC . G06F 11/20; G06F 11/2002; H04L 65/1006; H04L 65/105; H04L 65/1069; H04L 65/1073; H04L 67/28; H04L 69/40
See application file for complete search history.

(56) References Cited

U.S. PATENT DOCUMENTS 7,284,051 B1 * 10/2007 Okano ................ H04L 67/1008
709/224
7,467,208 B1 * 12/2008 Hurtta ..................... H04W 4/24
370/231

(Continued)

FOREIGN PATENT DOCUMENTS

CN              1795654 A     6/2006
DE      10 2005 009107 B3    7/2006
(Continued)

OTHER PUBLICATIONS

International Search Report for PCT/EP2012/069823 dated Jan. 17, 2013.

(Continued)

*Primary Examiner* — Joshua P Lottich
(74) *Attorney, Agent, or Firm* — Fay Sharpe, LLP

(57) ABSTRACT

For SIP proxy failover in a SIP telecommunication network (SIPN) comprising a plurality of proxies (P1, P2) and a domain name server (DNSR), the method comprises the following steps: storing, in the domain name server (DNSR), the addresses of the proxies that are working; if a first proxy (P1) shuts down, then informing (42) the domain name server (DNSR) that this first proxy has shutdown; then, if a user agent (SIPUA1) sends a domain name system request (43) to the domain name server (DNSR), sending (44), from the domain name server (DNSR) to this user agent, a response only containing the respective addresses of proxies (P2) that are working; and then, said user agent registering itself in a proxy (P2) the address of which is contained in the response from the domain name server (DNSR).

7 Claims, 3 Drawing Sheets

(51) Int. Cl.
   *H04L 29/06*   (2006.01)
   *H04L 29/14*   (2006.01)
   *H04L 29/08*   (2006.01)

(56) References Cited

U.S. PATENT DOCUMENTS

| | | | | |
|---|---|---|---|---|
| 2002/0187777 | A1* | 12/2002 | Osterhout | H04M 3/54 455/417 |
| 2005/0159156 | A1* | 7/2005 | Bajko | H04L 67/147 455/435.1 |
| 2005/0176428 | A1* | 8/2005 | Gabor | H04L 67/14 455/435.1 |
| 2006/0153064 | A1* | 7/2006 | Caballero-McCann | H04L 67/14 370/216 |
| 2007/0058792 | A1* | 3/2007 | Chaudhari | H04L 29/06027 379/88.17 |
| 2008/0086556 | A1 | 4/2008 | Ramalingam et al. | |
| 2008/0101335 | A1* | 5/2008 | Badger | H04L 45/00 370/352 |
| 2008/0247381 | A1* | 10/2008 | Bohm | H04L 67/104 370/352 |
| 2009/0262724 | A1* | 10/2009 | Suzuki | H04L 67/1095 370/352 |
| 2009/0300407 | A1 | 12/2009 | Kamath et al. | |
| 2011/0141879 | A1* | 6/2011 | Ballard | H04L 41/06 370/217 |

FOREIGN PATENT DOCUMENTS

| | | |
|---|---|---|
| JP | 2000-196677 A | 7/2000 |
| JP | 2002-111713 A | 4/2002 |
| JP | 2009-506680 A | 2/2009 |
| JP | 2009-159627 A | 7/2009 |
| KR | 10-2007-0103772 A | 10/2007 |

OTHER PUBLICATIONS

Hiroshi Kubota, "Intelligent DNS Service," Nikkei Network, Japan, Nikkei Business Publications, Inc., May 28, 2008, vol. 98, 3 pages.
English translation of Japanese Office Action dated Jun. 11, 2015, issued in connection with the corresponding Japanese Patent Application No. 2014-537549.

* cited by examiner

METHOD FOR SIP PROXY FAILOVER

BACKGROUND OF THE INVENTION

1. Field of the Invention

The present invention generally relates to a method for SIP (Session Initiation Protocol) proxy failover in a SIP telecommunication network.

FIG. 1 schematically represents an example of a classical SIP telecommunication network SIPN comprising two proxies P1, P2 and a domain name server DNSR. Telephone terminals respectively comprise user agents SIPUA1, SIPUA2, etc, and are linked to this SIP network via Ethernet links.

All SIP user agents SIPUA1, SIPUA2, etc, are registered to a same SIP domain, by using the procedures defined by standards RFC3261 and RFC3263, and especially Domain Name System (DNS) resolution. For instance, the user agent SIPUA1 has registered to the proxy P1, and the user agent SIPUA2 has registered to the proxy P2. For registering in a proxy, a user agent makes a "DNS request" to a DNS server in order get a list of proxy addresses, with a priority ranking, then it selects the proxy address having the highest priority in this list and registers to it. Once registered, it sends subsequent requests to that proxy (unless DNS server configuration is changed), in particular it sends requests to set up calls.

A SIP domain is generally managed by a set of proxies and these proxies are redundant, so that each proxy provides a failover function in case another one is shutdown (for maintenance purpose for example). For instance, if the proxy P1 is shutdown for maintenance, then the SIP User Agent SIPUA1 is supposed to switch to the backup proxy P2. But the SIP user agent SIPUA1 is not immediately aware, by SIP protocol means, that the proxy P1 is shutdown.

FIG. 2 illustrates the failover from the proxy P1 to the proxy P2 in this exemplary SIP telecommunication network SIPN. When the proxy P1 is shutting down, then the proxy P2 is taking over in order to serve all the user agents in the domain. When a user starts his/her SIP telephone, the SIP user agent SIPUA1 of this telephone makes the following steps:

Step 20: It send a DNS request to the DNS server DNSR, according to standard RFC3263, in order to solve the domain name.

Step 21: The DNS server DNSR responds by a DNS response containing proxy addresses respectively pointing to the proxy P1 in first priority and to the proxy P2 in second priority.

Step 22: Some time later, the proxy P1 shuts down.

Step 23: Some time later, the user of this telephone calls another telephone user. The user agent SIPUA1 again sends a DNS request to the DNS server DNSR, according to standard RFC3263, in order to solve the domain name.

Step 24: The DNS server DNSR responds by a DNS response containing proxy addresses respectively pointing to the proxy P1 in first priority and to the proxy P2 in second priority, because it is not aware of the shutdown of the proxy P1.

Step 25: Then the user agent SIPUA1 sends a message "INVITE sip:bob@example.com" to the proxy P1, because it has the highest priority. The proxy P1 fails to establish a session because it is shutdown. It does not respond at all. The terminal is waiting for a response.

Step 26: In the user agent SIPUA1, a timer B (request timeout, see timer reference in RFC3261) expires after a predetermined time.

Step 27: Then the user agent SIPUA1 sends a message "INVITE sip:bob@example.com" to the proxy P2, that has a second priority in the list of proxy addresses received from the domain name server DNSR.

Step 28: The proxy P2 responds by a message "403 Forbidden" because the user agent SIPUA1 is not registered in the proxy P2.

Step 29: The user agent SIPUA1 sends an acknowledgement message "ACK" to the proxy P2.

The call establishment has not been possible because the SIP User Agent SIPUA1 is not registered to proxy P2. This registration will occurs later, at the registration refresh time (according to RFC3261 registration refresh). So a call will be possible after the refresh time, but this delay may be long (several minutes).

2. Description of the Prior Art

The best existing solution is described in RFC3261, RFC3263, and RFC5626 section 4.5:

RFC3261 defines a refresh time (named "expire") at which a SIP user agent tries to register again to the same proxy.

RFC5626 defines an algorithm to accelerate the recovery in case a proxy is not reachable.

RFC3263 sends a "DNS SRV" message to communicate the list of backup proxies.

The sip user agent must use this list of proxies (with a priority ranking) to switch to a recovery proxy.

This known solution is not good enough, because the recovery time is too long, this time should be as short as possible. Let's try to estimate this time:

When an INVITE message is sent to proxy P1, a timer B is started and will expire before the shutdown is detected. By default, the timer B (cf. RFC3261) lasts 32 seconds.

When a second INVITE message is sent to the proxy P2, it is rejected because it is not registered to the proxy P2. To register again, it may last, at worst, the expire time which can be very long (several minutes).

Another known solution, illustrated by FIG. 3, comprises a common database CDB where all the proxies P1, P2, of a domain, store the registration addresses of all the user agents. However if a SIP user agent, SIPUA 3 for instance, is behind a router R comprising a network address translator (commonly abbreviated "NAT"), this solution doesn't work anymore: Actually, the network address translator assigns two different transport addresses (IP address+port), respectively 10.0.0.1:3333 and 10.0.01:2222 for instance, when an a message is forwarded to the proxy P2, and when a message is forwarded to the proxy P1. So the registration address (10.0.0.1:3333) used for reaching the proxy P2 cannot be re-used for reaching the proxy P1, in case of failure of the proxy P2, though this registration address (10.0.0.1:3333) has been registered in the common data base DB.

Thus, there is a need to provide a technical solution for providing a quick SIP proxy failover. It is peculiarly important when users are waiting for emergency phone calls to be set up.

This problem can be solved by applying the method according to the invention.

SUMMARY OF THE INVENTION

The object of the invention is a method for SIP proxy failover in a SIP telecommunication network comprising a plurality of proxies and a domain name server, this method comprising the following steps:

storing, in the domain name server, the addresses of the proxies that are working;

if a first proxy shuts down, then informing the domain name server that this first proxy has shutdown;

then, if a user agent sends a domain name system request to the domain name server, sending, from the domain name server to this user agent, a response only containing the respective addresses of proxies that are working, and then, said user agent registering itself in a proxy the address of which is contained in the response from the domain name server.

Thanks to this method, when shutting down a SIP proxy, the domain name server is updated to memorize that this proxy is not available. When a user agent needs to send a message to a proxy, the domain name server provides it with at least one address of a proxy that is working. So the user agent does not send any message to a proxy that is not available any more. This way dramatically shortens the waiting time of a user when a SIP proxy failover occurs.

Another object of the invention is a SIP proxy, a domain name server, and SIP user agent for implementing this method. An algorithm is distributed in the SIP proxies, the DNS server and the SIP User Agent.

Other features and advantages of the present invention will become more apparent from the following detailed description of embodiments of the present invention, when taken in conjunction with the accompanying drawings.

BRIEF DESCRIPTION OF THE DRAWINGS

In order to illustrate in detail features and advantages of an embodiment of the present invention, the following description will be with reference to the accompanying drawings. If possible, like or similar reference numerals designate the same or similar components throughout the figures thereof and description, in which.

DETAILED DESCRIPTION OF A PREFERRED EMBODIMENT

The method according to the invention is applied by executing the following algorithms, respectively in the proxies, the DNS server, and the SIP user agents.

Algorithm in a proxy:
When the proxy starts, it sends a message to the DNS server, this message informing the DNS server that this proxy has started. This message is "domain name:proxy name:proxy IP address:UP".

According to the invention, when the proxy shuts down it sends a message to the DNS server, this message informing the domain name server that this proxy has started. This message is "domain name:proxy name:proxy IP address:DOWN".

If this proxy starts again, then it sends a message to the DNS Server, this message informing the DNS server that this proxy is working again. This message is "domain name:proxy name:proxy IP address:UP".

Algorithm in the DNS Server:
It is waiting for messages from proxies.
When it receives a message from a proxy:
If message type is "UP", then it enables the name of this proxy for any DNS response it will send for that domain.
If message type is "DOWN", then it disables the name of this proxy for any DNS response it will send for that domain.

So, if a user agent sends a domain name system request to the domain name server, this latter sends, to this user agent, a response only containing the respective addresses of proxies that are working.

Algorithm in a SIP user agent, when it needs to send a message to a proxy:
The user agent sends a DNS request to the DNS server.
The user agent receives a DNS response containing the address of a proxy or a list of addresses of proxies, with a priority ranking.
The user agent selects from the DNS response the target proxy address to send the SIP message (as specified in RFC3263 statements)
According to the invention, it compares the selected target proxy address to the address of the proxy where it is currently registered to:
If the address of the proxy where it is currently registered to is equal to the selected target proxy address, then it is allowed to send a message to this selected target proxy address.
If the address of the proxy where it is currently registered to is not equal to the selected target proxy address, then prior to send the message to that selected target proxy address, it initiates a registration to it through a REGISTER transaction.

For instance, let us consider a SIP telecommunication network SIPN comprising two proxies P1, P2 and a domain name server DNSR. Telephone terminals respectively comprise user agents, such as SIPUA1, that is linked to this SIP network via an Ethernet link.

Figure 1:
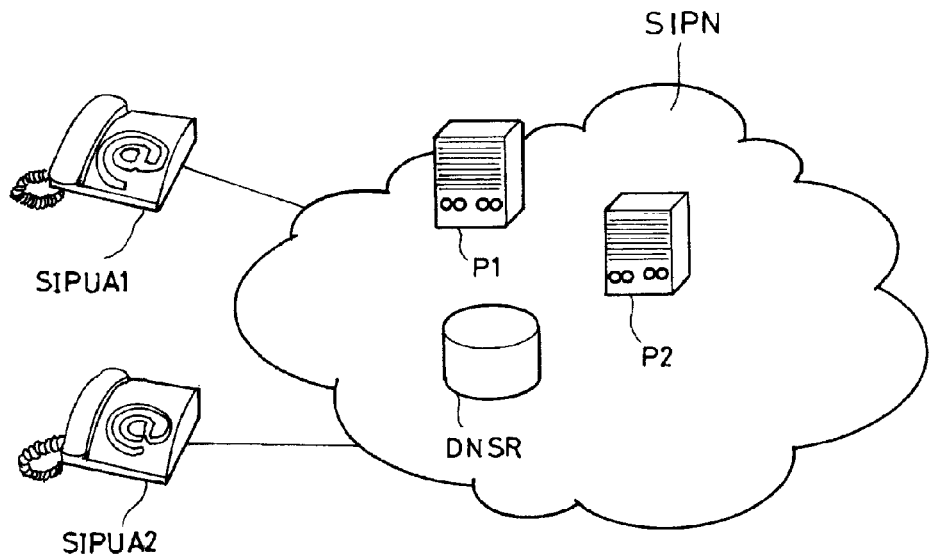
FIG. 1, described above, schematically represents an example of a classical SIP telecommunication network.
Figure 3:
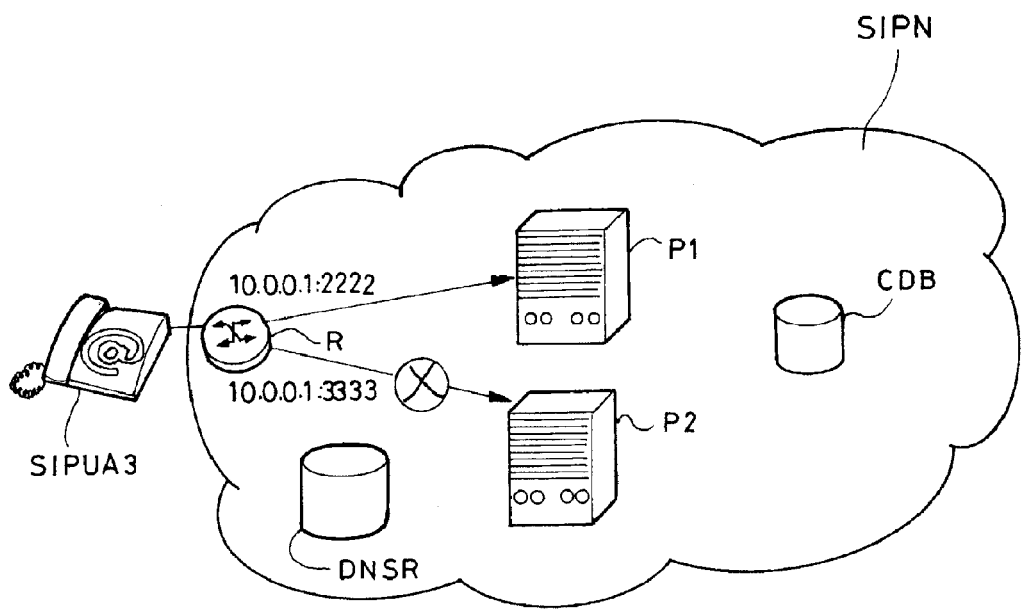
FIG. 3, described above, shows a signaling flow for an example in which a second known method is applied for a proxy failover.
Figure 2:
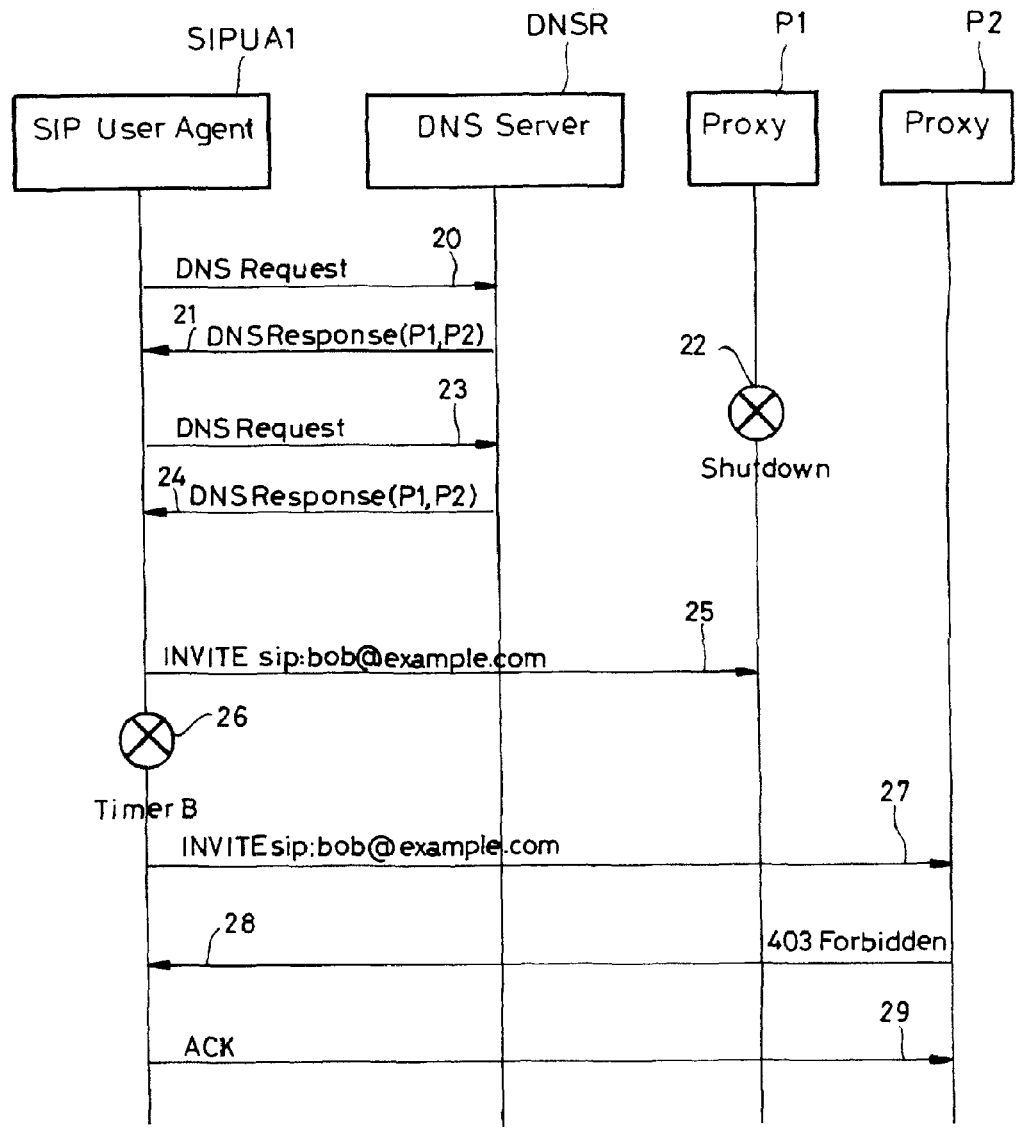
FIG. 2, described above, shows a signaling flow for an example in which a first known method is applied for a proxy failover.
Figure 4:
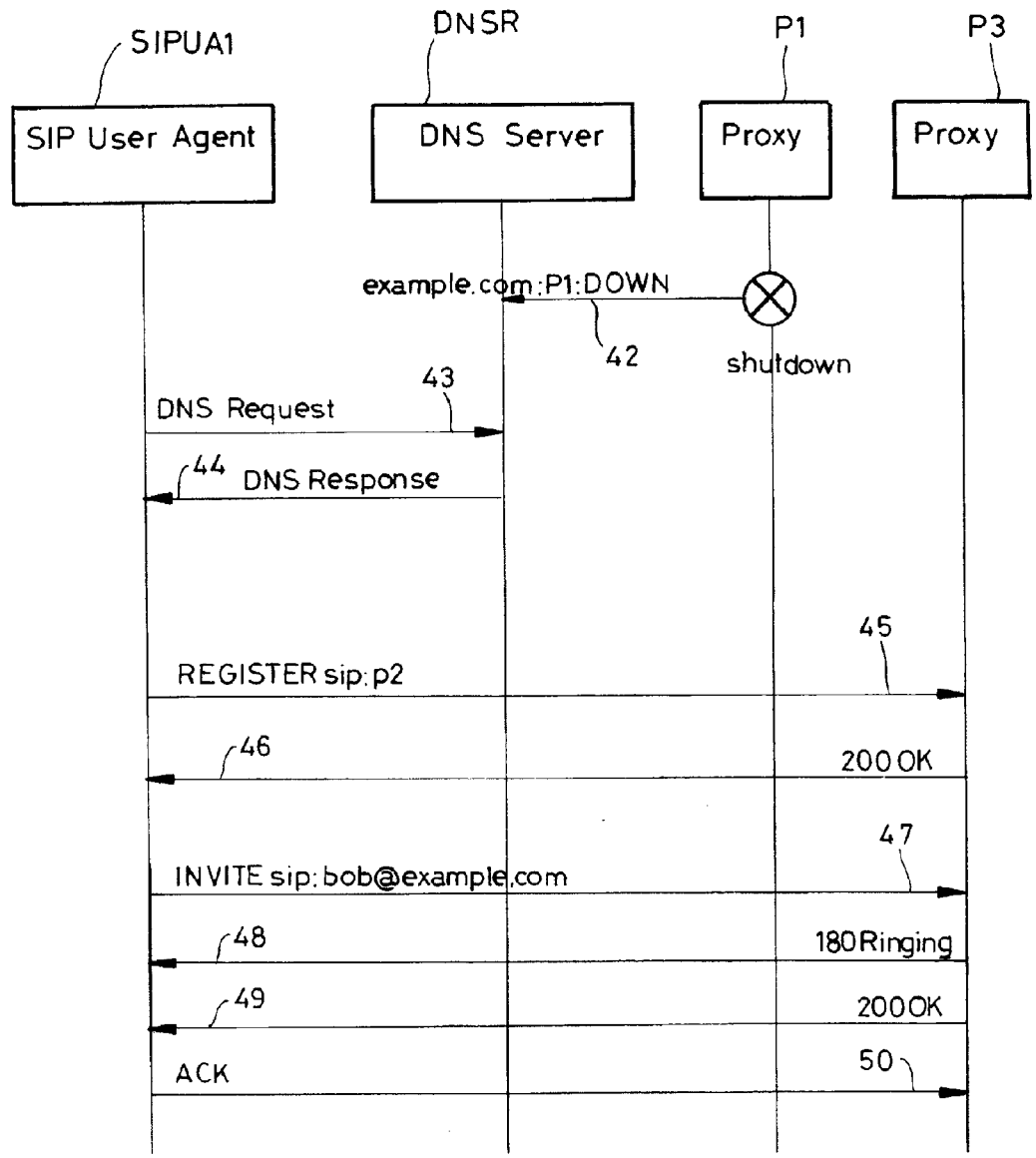
FIG. 4 shows a signaling flow for an example in which the method according to the invention is applied for a proxy failover.

FIG. 4 shows a signaling flow for this exemplary telecommunication network, in which the method according to the invention is applied for the failover from the proxy P1 to the proxy P2. At the considered instant, the proxies P1 and P2 are working. The domain name server DNSR memorizes the address of proxy P1 and the address of proxy P2 in a data base (not represented). So, when the domain name server DSNSR receives a DNS request, it responds by a DNS response containing the address of the proxy P1 and the address of the proxy P2, with a priority ranking. In this example, the proxy P1 has the highest priority. For instance, a user agent SIPUA 1 has been registered in the proxy P1 because it placed a phone call earlier (This previous event is not represented).

Step 42: Now, the proxy P1 shuts down. It informs the DNS server DNSR of that event by sending a message "example.com:P1:DOWN" to it. The DNS server DNSR is now aware that the proxy P1 cannot be reached. It removes the address of proxy P1 from its database, so that the address of the proxy P1 will not be included in any DNS response that the domain name server DNSR will send.

Step 43: Some time later, the user of the user agent SIPUA1 wants to call Bob. The SIP user agent SIPUA1 makes a DNS request to the DNS server DNSR.

Step 44: The DNS server DNSR answers by a DNS response only containing the address of the proxy P2.

Step 45: The user agent SIPUA1 selects a proxy according to RFC3263 statements. In this example, proxy P2 is the only proxy in the list provided by the DNS server, so user agent SIPUA1 selects the proxy P2. According to the invention, it compares the address of the proxy P2 to the address of the proxy where it is currently registered to, i.e. proxy P1. Since the address of the proxy P2 is different of the address of the proxy P1, the user agent SIPUA1 sends a message "REGISTER sip:p2" to proxy P2, for registering in the proxy P2. This latter replaces P1.

Step 46: The proxy P2 sends an acknowledgement message "ACK" to the user agent SIPUA1.

Step 47: Then, the user agent SIPUA1 sends a message INVITE sip:bob@example.com" to the proxy P2.

Step 48: The proxy P2 answers by a message "180 Ringing" indicating that the destination terminal is ringing.

Step 49: Then proxy P2 sends a message "200 OK" to the user agent SIPUA1.

Step 50: The user agent SIPUA1 sends an acknowledgement message "ACK" to the proxy P2.

Now, let's estimate the switching delay for the SIP user agent SIPUA1 for instance:

Let's suppose the round trip time to DNS server DNSR and proxies P1, P2 is 50 milliseconds:
DNS exchange (request+response) will last 50 ms,
REGISTER exchange (REGISTER+200 OK) will last 50 ms.
Total delay is: 50+50=100 milliseconds.

This is a very big improvement compared to already existing solutions (see former estimations of 32 seconds). This makes this solution much better than the current state of the art. The method according to the invention will much decrease the delay for the user when a SIP proxy is shutdown. If we apply it to IMS (IP Multimedia Subsystem) for example, the carrier will provide a much better quality of service for the user because the unavailability time will be dramatically improved.

This solution is compatible with routers comprising address translators (NAT) because the new registration it triggers will update contact information into the new proxy. In the example of FIG. 4, if there is a NAT binding used for communication between the user agent SIPUA1 and the main proxy P1, the backup proxy P2 will not use this NAT binding used for communication between the User Agent and main proxy P1, but will use a new dedicated NAT binding created by new registration.

There is claimed:

1. A method for SIP proxy failover in a SIP telecommunication network comprising a plurality of SIP proxies and a domain name server, comprising:
   storing, in the domain name server, addresses of the SIP proxies that are working,
   if a first SIP proxy shuts down, then informing the domain name server that the first SIP proxy has shutdown;
   then, if a user agent sends a domain name system request to the domain name server, sending, from the domain name server to the user agent, a response containing the addresses of only SIP proxies that are working,
   and then, said user agent registering itself in a SIP proxy with an address contained in the response from the domain name server.

2. A SIP proxy comprising:
   a memory configured to store executable instructions; and
   one or more hardware processors configured to access the memory to execute the instructions and to:
      if the proxy shuts down, send a message from the SIP proxy to a domain name server, the message indicating that the SIP proxy has shut down;
      if the SIP proxy starts, send a message from the SIP proxy to said domain name server, the message indicating that the SIP proxy has started.

3. A non-transitory computer readable storage medium comprising computer-executable instructions for performing a method when run on a computer, the method comprising:
   if an SIP proxy shuts down, then sending a message from the SIP proxy to a SIP domain name server, the message indicating that the SIP proxy has shut down;
   if the SIP proxy starts, then sending a message from the SIP proxy to said domain name server, the message indicating that the SIP proxy has started.

4. A domain name server for a domain, comprising:
   a memory configured to store executable instructions; and
   one or more hardware processors configured to access the memory to execute the instructions and to:
      when the domain name server receives a message from a SIP proxy, indicate that the SIP proxy has started, then enabling the name of the SIP proxy for all records for said domain;
      when the domain name server receives a message from the SIP proxy, indicate that the SIP proxy has shut down, then disabling the name of the SIP proxy for all records for said domain.

5. A non-transitory computer readable storage medium comprising computer-executable instructions for performing a method when run on a computer, the method comprising:
   if a message is received, indicating that a SIP proxy has shut down, then disabling the name of said SIP proxy for all records for a domain;
   Else, if the message indicates that a SIP proxy is working, then enabling the name of the SIP proxy for all records for said domain.

6. A SIP user agent comprising:
   a memory configured to store executable instructions; and
   one or more hardware processors configured to access the memory to execute the instructions and to:
      send a domain name request to a domain name server,
      then receive a response containing at least one SIP proxy address,
      then select one SIP proxy address from the at least one SIP proxy address contained in the response,
      then, if the selected SIP proxy address is not equal to the SIP proxy address where the user agent is currently registered, send a registration request to the selected SIP proxy address.

7. A non-transitory computer readable storage medium comprising computer-executable instructions for performing a method when run on a computer, the method comprising:
   sending a domain name request to a domain name server,
   then receiving a response containing at least one SIP proxy address,
   then selecting one SIP proxy address from the at least one SIP proxy address contained in the response,
   then, if the selected SIP proxy address is not equal to the SIP proxy address where the user agent is currently registered, sending a registration request to the selected SIP proxy address.

* * * * *